United States Patent [19]

Grove

[11] 4,026,515
[45] May 31, 1977

[54] FLOW CONTROL APPARATUS

[75] Inventor: Marvin H. Grove, Houston, Tex.

[73] Assignee: M & J Valve Company, Houston, Tex.

[22] Filed: Jan. 31, 1975

[21] Appl. No.: 545,765

Related U.S. Application Data

[63] Continuation-in-part of Ser. No. 400,790, Sept. 26, 1973, abandoned.

[52] U.S. Cl. .............................. 251/172; 137/312; 277/212 C; 277/172; 251/175
[51] Int. Cl.$^2$ .......................................... F16K 25/00
[58] Field of Search .......................... 251/172, 175; 277/212 R, 212 C, 171, 172

[56] References Cited

UNITED STATES PATENTS

| 2,101,991 | 12/1937 | Finley | 251/175 X |
| 2,126,739 | 8/1938 | Corbin | 251/175 |
| 2,886,283 | 5/1959 | Natho | 251/175 |
| 3,095,008 | 6/1963 | Rudelick | 251/175 X |
| 3,096,071 | 7/1963 | Fisher | 251/175 X |
| 3,307,633 | 3/1967 | Newall | 251/175 X |

FOREIGN PATENTS OR APPLICATIONS

1,288,146  2/1962  France .............................. 277/212

Primary Examiner—Harold W. Weakley
Attorney, Agent, or Firm—Flehr, Hohbach, Test, Albritton & Herbert

[57] ABSTRACT

A fluid flow control apparatus making use of sealing means formed in two parts, one being carried by the body and the other by an operating rod or strut which reciprocates between operating positions. One of the parts is a sealing assembly which carries resilient sealing means, and the other part provides a cylindrical surface with which the sealing assembly cooperates. The sealing assembly is characterized by the use of one and preferably two cup-shaped sealing members of resilient material which are assembled and restrained by means which prevents fluid differential pressures or fluid flow from disrupting or distorting the sealing members from normal operating configurations. In one embodiment, the sealing assembly is in the form of a plunger which is movable into and out of a cylindrical sleeve carried by the body. In another embodiment the sealing assembly is carried by the body, and the other part provides the cylindrical surface and forms a closure which can be moved into and out of the sealing assembly.

11 Claims, 11 Drawing Figures

FLOW CONTROL APPARATUS

CROSS-REFERENCE TO RELATED APPLICATIONS

This application is a continuation-in-part of my co-pending application Ser. No. 400,790 filed Sept. 26, 1973 now abandoned.

BACKGROUND OF THE INVENTION

This invention relates generally to flow control apparatus such as is used for controlling the flow of various fluids, including gases and liquids.

U.S. Pat. No. 3,827,285 discloses a fluid flow control apparatus which makes use of a plunger-like closure assembly which is movable into and out of a cylindrical sleeve forming a part of the body and interposed between two fluid spaces or passages. The plunger establishes a seal with respect to the inner cylindrical surface of the sleeve when in closed position, by the use of cup-shaped sealing members of resilient material. The cup-shaped sealing members are faced in opposite directions. When the assembly is retracted from the sleeve and the sealing members relaxed, the annular edge portions of the rims of the sealing members have a diameter greater than the diameter of the cylindrical surface. When the assembly is moved into the sleeve, the rims of the sealing members are contracted, and have sealing engagement with the cylindrical surface.

Apparatus as described above functions satisfactory when the flow gates and fluid pressure differentials are not great. If it is attempted to use such apparatus on surfaces where the fluid pressure differentials are relatively high, coupled with high fluid flow rates as the plunger is moved between open and closed positions, the resilient sealing members may be distorted from normal operating configurations, whereby the sealing members may suffer injury and the apparatus as a whole made inoperative or ineffective to maintain a tight shut-off.

SUMMARY OF THE INVENTION

It is an object of the present invention to provide apparatus for controlling fluid flow which makes use of cup-shaped sealing members of resilient material, and which is constructed in such a manner that it is capable of operation under conditions of relatively high fluid pressure differentials and/or flow rates.

Another object of the invention is to provide a flow-controlled apparatus making use of cup-shaped sealing members of resilient material, in which the assembly which carries the sealing members is provided with means for restraining the rims of the sealing members whereby under various operating conditions they are not distorted to the extent of causing injury or preventing normal operation.

In general, the present invention consists of a body having fluid flow passages adapted to be connected with associated piping. The flow passages communicate with spaced spaces within the body. Interposed between the passages there is sealing means utilizing two parts, one of which is carried by the body and the other of which is carried by an operating rod or strut whereby it can be reciprocated between limiting operating positions. One of the parts is a sealing assembly which includes one and preferably two cup-shaped sealing members made of resilient material, and dimensioned whereby their rims are caused to establish sealing engagement with a cylindrical surface of the other part, when the two parts are positioned one within the other. The assembly also includes restraining means effective to prevent distortion of the rims of the sealing members beyond normal operating configurations when the two parts are moved into and out of cooperating sealing relationship between closed and open positions, under conditions of relatively high fluid pressure differential and/or flow rates.

Additional objects and features of the invention will appear from the following description in which the preferred embodiment has been set forth in detail in conjunction with the accompanying drawing.

DESCRIPTION OF THE PREFERRED EMBODIMENTS

Figure 1:
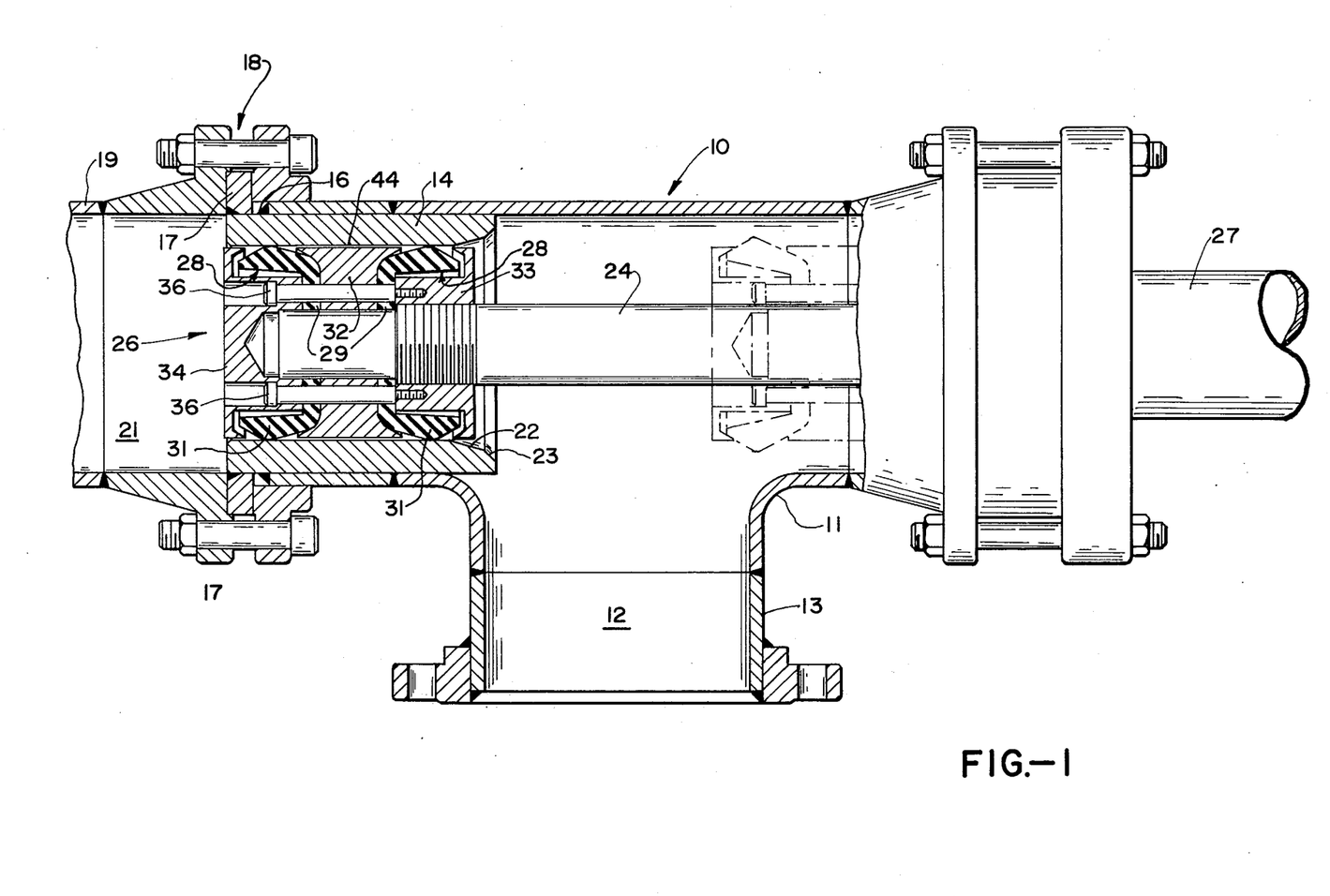
FIG. 1 is a side elevational view in section illustrating fluid control apparatus according to the present invention.

As shown in FIG. 1, the apparatus consists of a body 10 which may be fabricated by making use of a conventional tee 11, having a side opening 12 forming a fluid passage and a welded-on extension 13. A cylindrical sleeve 14 is fitted within one end portion of the tee 11, and is secured as by means of the weld connection 16. A flange 17 is shown secured to the sleeve 14 as by welding to facilitate engagement with coupling 18, the latter serving to connect the pipe 19 to the body. With this arrangement the sleeve 14 is interposed between the flow passage 12 and the flow passage 21 at the other end of the sleeve. At least one end of the sleeve 14 has a divergent entrant portion, which can be formed by the frustoconical surfaces 22 and 23. The flow passages 12 and 21 communicate with spaces within the body adjacent opposite ends of the sleeve 14.

Disposed axially of the sleeve 14 there is an operating rod 24, one end of which serves to carry the sealing assembly 26. The exterior end of the rod 24 preferably is directly connected with the power operator 27, which may be of the double-acting hydraulic piston-cylinder type operating between limiting positions.

As shown in FIG. 1, when the apparatus is in closed position, the sealing assembly 26 is within the sleeve 14. When the assembly is retracted to open position, it is located as indicated by dotted lines in FIG. 1, and is out of the way of fluid flow through the body.

In general, the sleeve 14 and the sealing assembly 26 form two cooperating parts which permit or shut off fluid flow through the body.

The sealing assembly in this embodiment includes two sealing members 28 which are cup-shaped, and made of suitable resilient material, such as suitable synthetic rubber or elastomer. Each of these members consists of a base portion 29, together with an annular rim portion 31. The rim portion of each sealing member is contracted when the assembly is in the closed position shown in solid lines in FIG. 1, and is expanded to the position shown in dotted lines in FIG. 1 when retracted. A spacer member 32 is interposed between the two resilient members 28, and the base portions 29 of the sealing members are clamped against the spacer 32, by the members 33 and 34 and the clamping studs 36.

The rims 31 of the resilient sealing members are provided with restraining means to prevent radial expansion beyond a normal configuration. The restraining means in each instance can consist of an annular member 37 which may be integral with or secured to the corresponding one of the clamping members 33 or 34, and which is formed to provide an annular rim or shroud 38 which envelops or overlaps the free edge portion 39 of the rim of the corresponding sealing member.

The general configuration of the parts described above can be seen in FIG. 2. In this instance the outer annular surfaces 41 and 42 of the resilient rims 31, as viewed in section, conform to two truncated conical surfaces that are oppositely sloped. These surfaces are joined by the rounded surface 43 which functions as a sealing surface or annular sealing area when it is in engagement with the cylindrical surface 44 of the sleeve 14. The inner peripheral surface of the restraining shroud 38, indicated at 46, is likewise shown to conform with a truncated cone, having the same slope as the surface 42 when the resilient rim 31 is relaxed and expanded. The exterior peripheral surface 47 of the shroud 38 has a diameter slightly less than the diameter of the cylindrical surface 44. For example, if surface 44 has a diameter of 6 inches, shroud 38 may have a diameter of 5⅞ inches.

Figure 2:
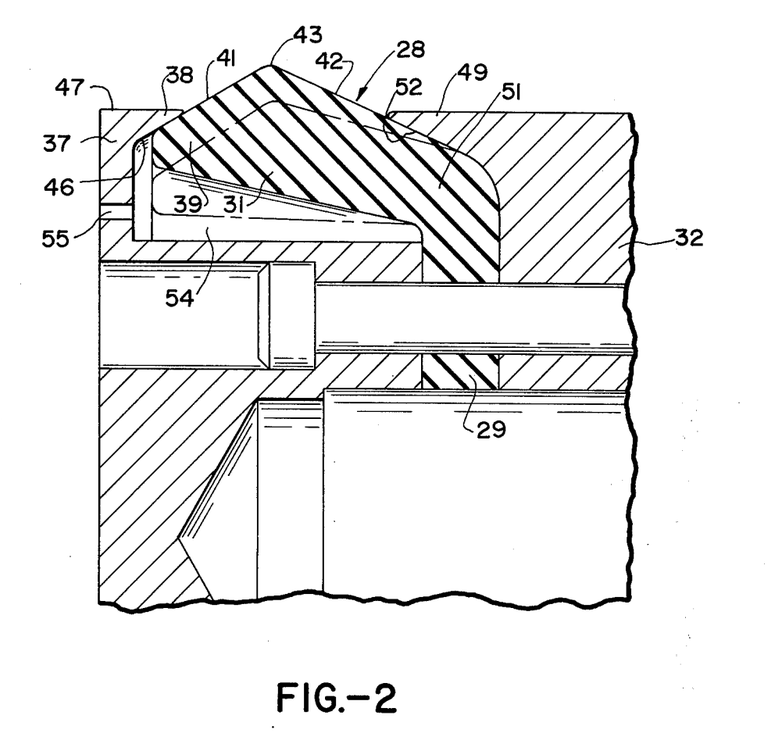
FIG. 2 is an enlarged detail in section showing the configuration of one of the sealing members when relaxed, and also indicating by dotted lines the position when the assembly is within the sleeve and is contracted.

Since the shroud 38 overlaps the edge portion 39 of the rim 31, it functions to restrict or restrain expansion of the rim beyond the position shown in solid lines in FIG. 2. However, it permits the rim to be contracted when the assembly is positioned within the sleeve 14, in which event the rim takes the position shown in dotted lines in FIG. 2.

Operation of the apparatus described above is as follows. Assuming that the assembly 26 is in closed position within the sleeve 14, that passageway 21 represents the upstream side, and that a substantial pressure differential exists between the passages 21 and 12, fluid pressure acts upon the rim 31 of the left-hand sealing member to urge the same outwardly in a radial direction, whereby the annular surface 43 is pressed into sealing engagement with the cylindrical surface 44 of the sleeve 14. The annular surface 43 of the downstream sealing member, or in other words, the right-hand member of FIG. 1, is pressed into contact with cylindrical surface 44, but only by virtue of the resilience of the rim which urges it to expand in a radial direction. Under these conditions the seal is established by the left-hand sealing member of FIG. 1. Assuming that it is now desired to move the assembly to the open out of the way position shown in dotted lines in FIG. 1, to permit free flow through the body, the operator 27 moves the rod 24 to the right whereby the right-hand sealing member is first retracted from the sleeve. When the right-hand sealing member is fully retracted, it expands to the position shown in FIGS. 2 and 3. The configuration as viewed in section, when expanded or in relaxed condition, is such that the surface 41 is adjacent to or in contact with the surface 46 of the restraining shroud 38.

Preferably the spacer 32 is also formed to provide means for restraining the adjacent annular portions of the sealing members. Thus the spacer is provided with annular lips 49. As shown in FIG. 2 each lip 49 surrounds an annular rim portion 51 near the junction between the rim and the base portion 29 and has an inner surface 52 conforming generally to a truncated cone.

Figure 3:
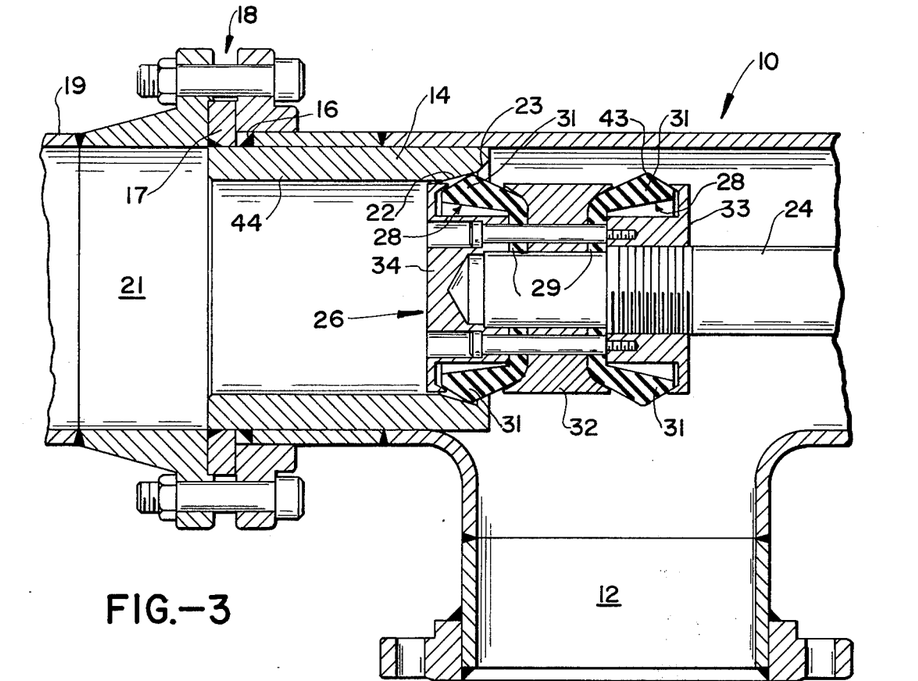
FIG. 3 is a side elevational view in section showing the closure assembly being withdrawn from the sleeve but immediately before the seal is broken.
Figure 4:
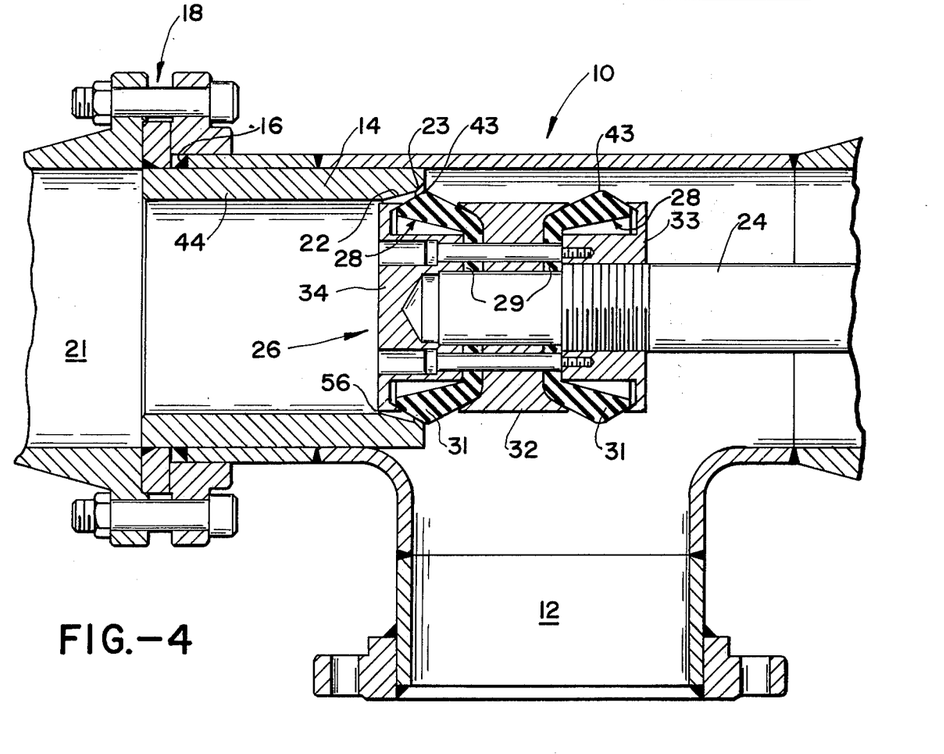
FIG. 4 is a side elevational view in section like FIG. 3 but showing further movement of the closure assembly to break the seal.

When the closure assembly is moved toward the right from the closed position of FIG. 1, the left-hand sealing member remains in sealing engagement with the cylindrical surface 44 of the sleeve, until the sealing member reaches the position shown substantially in FIG. 3, where the surface 43 is about to be retracted from contact with the entrant surface 22 of the sleeve. Further movement of the assembly to the position shown in FIG. 4 serves to break the seal between the left-hand sealing member and the entrant portion of the sleeve 14, at which time fluid flow occurs about the sealing member, and also about the restraining shroud 38. It will be evident that for the position shown in FIG. 4 there is a flow restricting orifice 56 between the periphery of the shroud 38 and the cylindrical surface 44 of the sleeve 14, which is on the upstream side of the orifice between the left-hand sealing member and the entrant surface of the sleeve 14. Flow through the restricting orifice 56 serves to reduce the fluid pressure forces acting upon the rim of the left-hand member, and in addition serves to reduce the flow velocity about the rim of the left-hand sealing member. However, fluid pressure acting upon the rim of the left-hand sealing member tends to radially expand the same, but this radial expansion is limited by engagement of the annular edge portion of the rim 31 with the restraining shroud 38.

In the event the closure assembly is moved to closed position from the full open position shown in dotted lines in FIG. 1, and this movement is against the fluid pressure, the restraining shroud 38 at the left-hand end of the assembly shown in FIG. 1 first enters the sleeve 14, thereby forming a flow-restricting orifice serving to reduce fluid flow. As the rim 31 of the left-hand sealing member approaches proximity with the entrant portion of the sleeve 14, fluid differential is applied to the rim tending to expand the same radially, but within the operating limits for which the apparatus is designed, such forces do not expand the rim to cause it to take an abnormal configuration, because of the restraining action of shroud 38. Therefore the assembly can be moved into the sleeve 14, with successive contraction of the rims of the two sealing members, until the fully closed position is reached as shown in FIG. 1.

Assuming that passage 12 represents the upstream side, the operation is the same as described above. However, under such conditions the rim 31 of the right-hand sealing member forms the pressure resisting seal when in the closed position shown in FIG. 1. When the assembly is moved to an open position, the rim 31 of the right-hand sealing member expands radially until further expansion is prevented by engagement with the corresponding restraining shroud 38. Thereafter further movement breaks the seal with the sleeve, thus permitting some flow to occur past the right-hand seal. Such flow is restricted by virtue of the restricted orifice between the spacer 32 and the cylindrical surface 44, and also between the shroud 38 at the left-hand end of the assembly, and the cylindrical sleeve surface.

In the above description, particular reference has been made to the restraining shrouds 38 in preventing radial expansion of the rims of the resilient sealing members beyond a predetermined amount. As previously mentioned, a portion of each rim for its relaxed or expanded condition is also supported by the lips 49 formed on the spacer 32.

By use of the invention it is possible to construct apparatus which will effectively control fluid flow at relatively high flow rates and pressure differentials. By way of example, apparatus has been constructed substantially as shown in FIG. 1, with the sleeve 14 having an internal diameter of six inches. The parts of the assembly were proportioned substantially as shown in FIG. 1. Under test conditions the apparatus could be opened and closed with fluid pressure differentials as high as 800 psi, without undue distortion or injury to the sealing members.

In general, the shroud 38 is effective to enable the associated sealing rim to withstand relatively high flow rates during opening and closing, whereas lips 49 assist in enabling the ring to withstand relatively high differential pressures.

The spaces 54 surrounded by the rims of the sealing members are shown provided with one or more vents 55 to prevent pressure entrapment and to equalize pressure acting on the rims when the closure assembly is in open position. The apparatus is particularly adaptable for handling various liquids, such as liquid petroleum products. Also it can be used for controlling flow of various gases, such as natural gas and the like.

Figure 5:
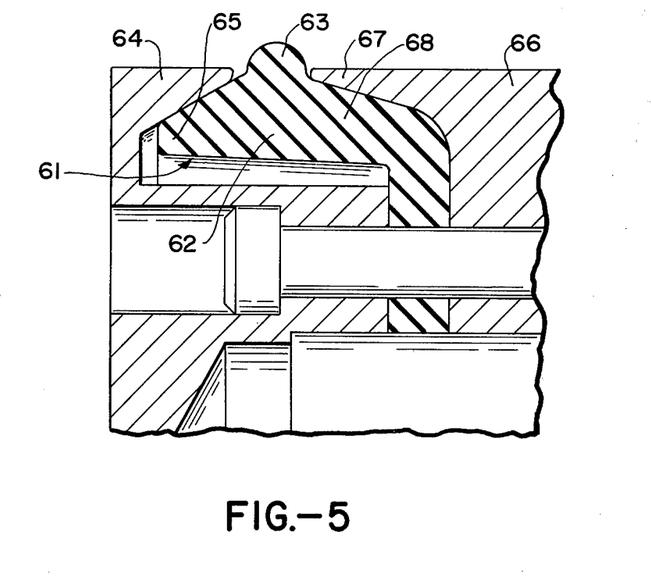
FIG. 5 is an enlarged detail like FIG. 2 showing another embodiment.

In FIG. 5 each sealing member 61, corresponding to members 28 of FIG. 2, has a modified configuration. The rim 62 is provided with a rib-like portion 63 that is rounded and which provides sealing contact with the surface 44 of the sleeve. The shroud 64 surrounds the edge portion 65 of the rim and the intermediate spacer 66 has a lip 67 dimensioned to restrain the portion 68. In general this embodiment operates in substantially the same manner as that shown in FIG. 1 – 4. However, it permits a reduction in the spacing between shroud 64 and lip 69, thus making it more difficult for fluid forces to extrude the rim through this gap. In general, such a construction makes possible operation at high pressure differentials.

Figure 6:
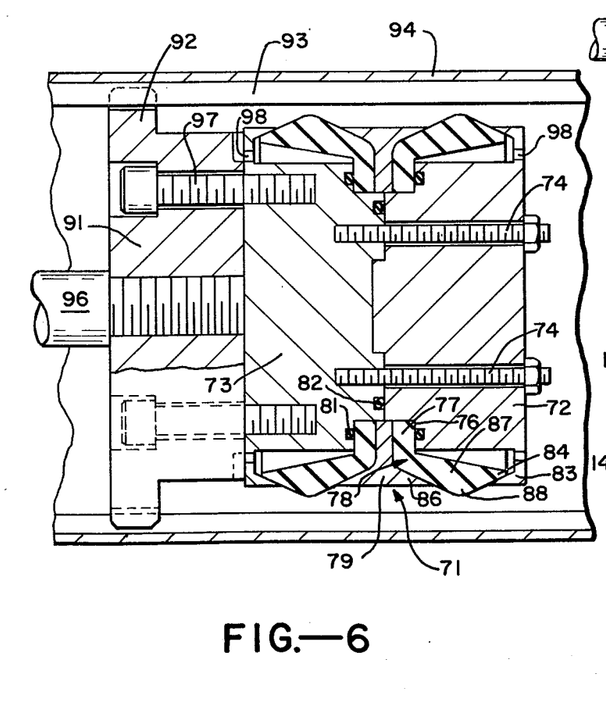
FIG. 6 is a side elevational view in section showing another embodiment of the sealing assembly.

The sealing assembly illustrated in FIG. 6 is particularly suitable for apparatus of the smaller sizes capable of handling higher pressures and flow rates. In general, the sealing assembly 71 consists of the two plates 72 and 73 which are circular in configuration and which are clamped together by bolts 74. The opposed faces of the members 72 and 73 are each provided with an annular recess 76 which accommodates the base portion 77 of the corresponding resilient sealing member 78. An annular member 79 is interposed between the base portions 77 of the two sealing members, and corresponds generally to the intermediate member 32 of the assembly shown in FIG. 1. The opposed faces of the members 72 and 73 are also provided with annular grooves serving to accommodate sealing means 81, preferably of the O-ring type, which establish seals between the sealing members and the clamping members 72 and 73. An additional sealing means 82 of the resilient O-ring type is shown for establishing a seal between the clamping members 72 and 73. The clamping members 72 and 73 in this instance likewise are constructed to provide the annular lip portions 83 which overlap the free edge portions 84 of the sealing members. Likewise, the intermediate member 79 is provided with annular lips 86 which overlap the portions of the sealing members adjacent the base portions 77. The flange or rim portions 87 of the sealing members in this instance have a configuration in section somewhat similar to what is shown in FIG. 2, and provide annular recess 88 which establish sealing contacts with a cylindrical surface provided by a cooperating closure.

The assembly shown in FIG. 6 may also include means for preventing rotation of the assembly during its movements between limiting positions. The means in this instance consists of a member 91 provided with slots 92 adapted to engage guide ribs 93. These ribs are secured as by welding to the walls of the cooperating body 94. The operating rod 96 is directly fixed to the member 91, which in turn is secured as by bolts 97 to the adjacent clamping member 73.

With the arrangement of FIG. 6, leakage past the base portions of the sealing members is prevented by the seals 81 and 82, and therefore such sealing relationship is not dependent upon clamping engagement between these base portions and the adjacent clamping surfaces of the members 72 and 73. Vents 98 are provided and correspond to vents 55 of FIGS. 1 and 2.

Figure 7:
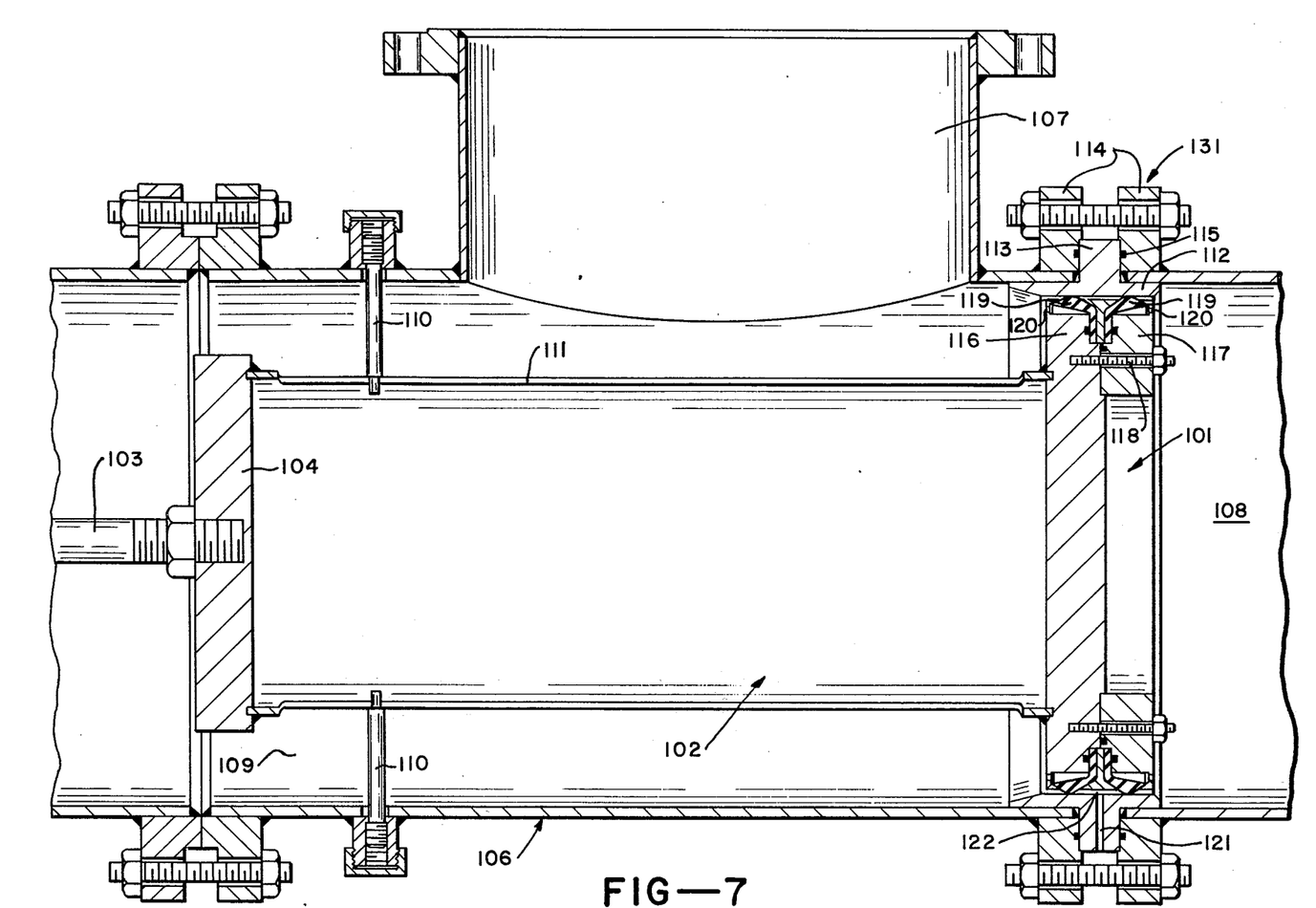
FIG. 7 is a side elevational view in section illustrating another embodiment that is applicable to apparatus made in larger sizes.

The apparatus shown in the embodiment of FIG. 7 is suitable for apparatus made in the larger sizes. In this instance the sealing assembly 101 is secured to one end of the hollow strut 102 which may be a suitable length of tubing or piping or proper strength. The operating rod 103 is secured to a plate 104 which is circular in configuration and is secured as by welding to one end of the strut 102. The body 106 in this instance is constructed to provide the side flow passage 107, and another flow passage 108 which communicates with the space 109. The operating rod 103 extends through a closure and packing gland at one end of the body, substantially as in FIG. 1. Rotation of the assembly 101 can be prevented by suitable means such as pins 110 which are mounted in the side walls of the body and which have their inner reduced ends disposed within slots 111 which extend longitudinally along opposite sides of the strut 102. The sleeve 112 of the sealing assembly includes an annular rim 113 which is clamped between the two coupling flanges 114. Suitable sealing means is provided such as the means 115 of the resilient O-ring type.

The assembly 101 consists of the two clamping members 116, 117, member 116 being secured as by welding to the corresponding end of the strut 102. The other clamping member 117 is annular, and is secured to member 116 as by means of bolts 118. The resilient sealing members 119 are similar to the sealing members shown in FIG. 6, and they are likewise supported by lips in the same manner as in FIG. 6. This embodiment likewise has vents 120 corresponding to vents 55 of FIGS. 1 and 2.

The apparatus shown in FIG. 7 operates in the same manner as the apparatuses previously described. However, the sealing assembly is more adequately supported by the strut 102, which in turn is guided by the pins 110. These pins not only prevent rotation, but also prevent axial displacement of the sealing assembly.

In FIG. 7 a duct 121 is shown communicating with the space 122 between the resilient sealing members when these members are in closed position within the sleeve 112. The purpose of this duct is to permit connection with external pressure responsive means, which can serve to indicate any leakage past the sealing assembly when it is in closed position. Suitable means for this purpose is disclosed in said U.S. Pat. No. 3,827,285.

In the foregoing embodiments, the sealing assembly which includes the two resilient sealing members is constructed to be moved into and out of a cooperating sleeve. In the embodiment illustrated in FIGS. 8 – 10, the sealing assembly is annular and is carried by the body. A closure member which is constructed to provide a cylindrical sealing surface is moved into and out of the sealing assembly to arrest flow or permit flow through the assembly. The general features of the apparatus shown in FIGS. 8 – 11 are disclosed and claimed in copending application Ser. No. 549,181 now U.S. Pat. No. 3,955,796, filed Feb. 12, 1975. The subject matter is being included herein because of the features of the sealing assembly, and the manner in which the flanges of the resilient sealing members are prevented from being distorted abnormally during operating conditions. The apparatus of FIGS. 8 – 11 includes the hollow body 130 made in two sections 130a and 130b. These sections are secured together by assembly 131 which serves both as a coupling and as the sealing assembly. The main part of the body is cylindrical and its one end is provided with flange 132 to facilitate attachment of closure plate 133. The operating means 14 can be mounted upon this plate. The other end of the body is provided with a portion 130c of reduced diameter to provide the opening or flow passage 137. A side wall of the body is also provided with opening or flow passage 138 together with a short pipe section or hub 139 which can be coupled to associated piping.

Figure 8:
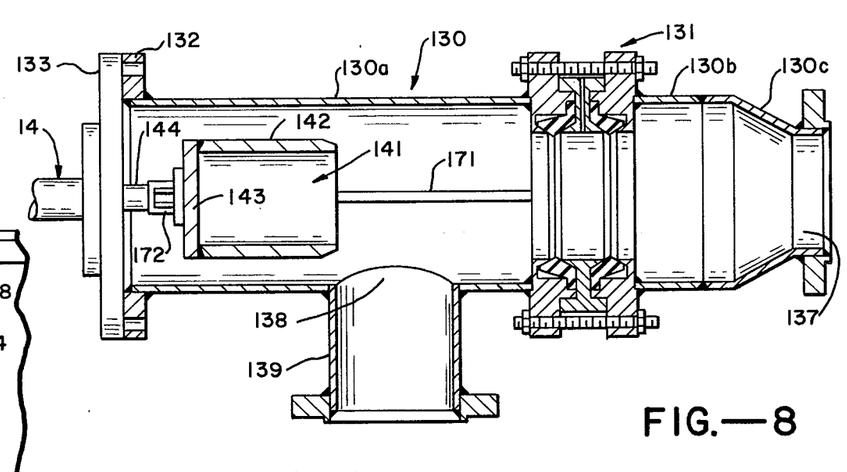
FIG. 8 is a side elevational view of another apparatus incorporating the invention, in which the sealing assembly is carried by the body.
Figure 9:
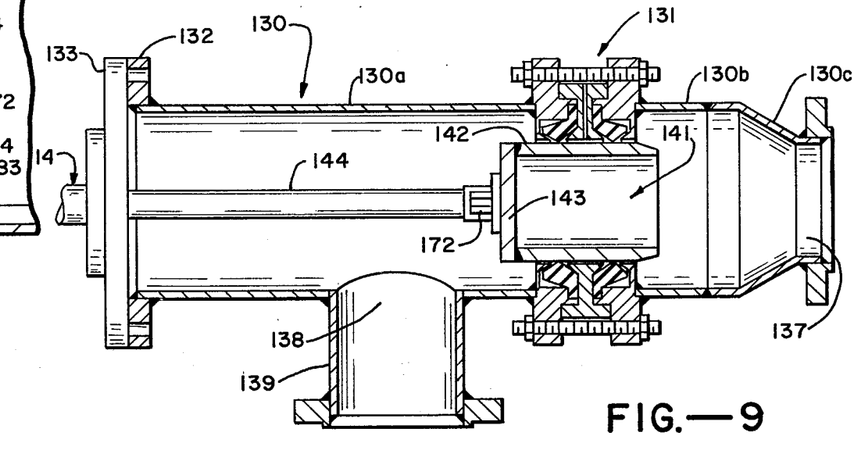
FIG. 9 is a side elevational view like FIG. 8 but showing the movable closure part in closed position.

The closure 141 can be moved to the open retracted position shown in FIG. 8 or to the closed projected position shown in FIG. 9. The closure is annular in section and provides a cylindrical outer peripheral surface 142. Its one end is secured as by welding to the plate 143, which in turn is secured to the operating rod 144. This rod is in alignment with the axis of the body and the axis of the closure 141, and extends through the plate 133 where it is provided with suitable sealing means.

Figure 10:
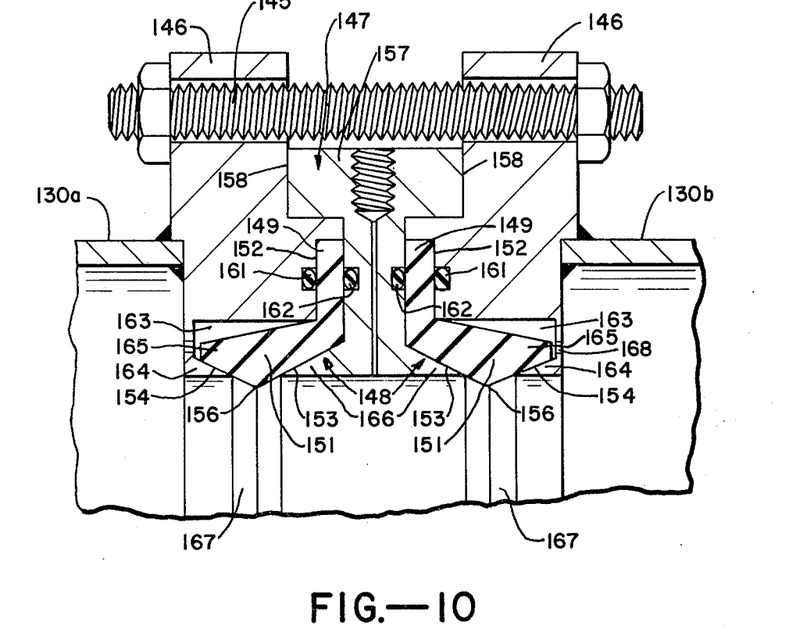
FIG. 10 is a cross-sectional detail on an enlarged scale showing the sealing means of the sealing assembly.
Figure 11:
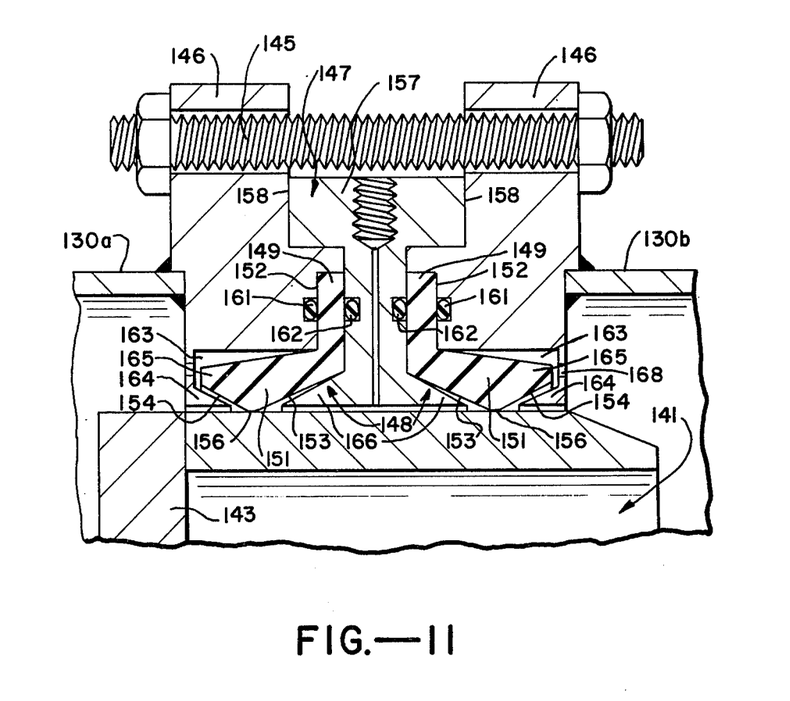
FIG. 11 is a detail like FIG. 10 but showing a cylindrical closure in cooperating sealing position with respect to the sealing assembly.

The sealing assembly is best illustrated in FIGS. 10 and 11. The two flange-like clamping annuluses 146 are secured as by welding to the adjacent body sections 130a and 130b. Between the two annuluses 146 there is a third intermediate annulus 147. The two cup-shaped sealing members 148 are clamped between the members 146 and 147 by bolts 145 and are made of suitable resilient material such as synthetic rubber or elastomer. Each of the members 148 includes an annular base portion 149 together with an inner rim portion 151. The base portions 149 are accommodated within the annular recesses 152 formed in the opposed faces of annuluses 146. The rim portion 151 of the sealing members, when relaxed as shown in FIG. 10, are convergent toward the axis of the assembly as they extend outwardly from the base portions 149. The inner peripheral surfaces 153 and 154 of each sealing assembly conform to oppositely angled truncated cones, and these surfaces join or merge along the annular sealing area 156.

The intermediate member 147 preferably consists of an outer annular portion 157 which is accommodated in recessing 158 formed in the members 146, and a web portion 159 which is interposed between the base portions 149 of the sealing members. Suitable sealing means is provided to ensure against leakage between the base portions 149 and the adjacent surfaces of the sealing members 148. Thus sealing means of the resilient O-ring type 161 is provided between the base portions and the members 146, and similar sealing means 162 is provided to prevent leakage between the base portions 149 and the portion 159 of the intermediate member 147. Suitable means such as bolts 162 serve to clamp the assembly together.

Means are provided which limit flexing of the resilient portions 151 inwardly. Thus the members 146 are formed to provide the inner annular recesses or cavities 163 which accommodate limited flexing movement of the portions 151. Also each member 164 is formed to provide an annular portion 164 which overlaps the edge portion 165 of the portion 151 of the corresponding sealing member. The inner peripheral surface of portion 164 is preferably made to conform to a truncated cone to conform with and provide a proper seat for the free edge portion 165 of the corresponding sealing member.

In addition to providing means which engage the outer edge portions 165 of the sealing members, the intermediate member 147 is provided with inner annular lip portions 166 which extend for a substantial distance toward the portions 164. The portions 166 are shown provided with outer peripheral surfaces conforming to truncated cones and which conform with the adjacent conical surfaces of the portions 141 of the sealing members 148.

Referring to the relaxed position of the sealing members shown in FIG. 10, the inner peripheral surfaces of the sealing member portions 151 under such conditions are seated upon the outer peripheral surfaces of the rigid metal portions 164 and 166. A minor annular area of the sealing members is exposed in the spaces 167 between the portions 164 and 166.

The spaces 163 (FIGS. 10 and 11) are provided with vents 168 corresponding to the vents 55 of FIGS. 1 and 2.

As is clar from FIGS. 8 and 9, the closure 141 has its axis in alignment with the axis of the assembly 131, and with the axis of the body 130. The outer diameter of the closure 141 is less than the opening provided by the metal annuluses 146 and 147 of the assembly 131, but is greater than the relaxed diameter of the sealing members, having reference particularly to the diameter of the sealing areas 156. When the closure 141 is in retracted position shown in FIG. 8, fluid is free to flow through the body between the flow passages 137 and 138. When it is desired to interrupt such flow, the closure is moved to the projected position shown in FIG. 9 and within the assembly 131. As the closure is moved into this closed position, it successively engages the sealing members 149 with the result that the portions 151 of the sealing members are flexed and expanded in a radial direction. This serves to establish the desired sealing contact between the sealing members and the outer cylindrical surface of the closure 141 along the areas 156, with wiping action which serves to ensure good sealing contact and to remove any foreign solids. Conversely, when it is desired to permit flow, the closure is moved to its retracted position which is shown in FIG. 8, and as it moves out of the assembly 131 it successively is disengaged from the sealing members whereby these members move back to the relaxed positions shown in FIG. 10. When the sealing members are in the position shown in FIG. 10, fluid pressure may act upon the exterior surfaces of the portions 151, thus tending to deflect the portions 151 inwardly. This condition occurs on the pressure side of the sealing assembly when the closure is in projected position and serves to urge the areas 156 against the closure. Also when the closure is being moved out of the sealing assembly toward the pressure side and is about to be separated from the corresponding sealing area 150 from the corresponding sealing member 148, the portions 164 and 166 limit inward flexing of the portions 151. Thus sealing members 148 are protected against injury that might otherwise occur under high pressure differential and flow rates. Excessive deflection is prevented by seating of the portions 151 upon the portions 164 and 166 of the members 146 and 147.

Rotation of the closure 141 in this instance is prevented by guide ribs 51 which are secured as by welding to the body 130. Rods 172 have their inner ends secured to the rod 144, and their outer ends are slotted to slidably engage the ribs 171.

I claim:

1. In fluid control apparatus, means forming a body having at least two spaced flow passages adapted to be connected to associated piping, and means including two cooperating parts movable relative to each other for permitting or arresting fluid flow through the body between passages, one of said parts comprising means forming a cylindrical surface, the other one of said parts comprising a sealing assembly, the assembly including at least one sealing member made of resilient material and substantially L-shaped in section, said member being formed to provide a generally circular flange or rim portion and a base portion to which the rim is secured, means having clamping engagement with the base portion for mounting the sealing member with the rim being free to flex a limited amount in a radial direction, one peripheral surface of the rim having a circular area located intermediate the base portion and the free edge portion of the rim and adapted to engage and form a fluidtight seal with respect to the cylindrical surface when the two parts are in interfitting relationship and in axial alignment, thereby arresting fluid flow between the passages, differential fluid pressure acting upon the rim from one of said passages tending to flex the same radially in a direction toward the cylindrical surface, means connected to one of said parts for movement of the same into and out of interfitting engagement with the other part, and means forming a part of the sealing assembly and serving to limit radial flexing of the rim under the force of fluid pressure, said means including a rigid member carried by said other one of said parts and disposed adjacent to one peripheral surface of the free edge portion of the rim of the sealing member and concentric therewith, the diameter of said last means relative to the diameter of the cylindrical surface being such as to permit the sealing assembly to have telescoping relationship between the sealing member and the rigid annular member and the cylindrical surface.

2. Apparatus as in claim 1 in which the means serving to limit radial flexing of the rim also includes an annular lip concentric with an annular portion of the rim adjacent the base portion thereof and disposed adjacent to one peripheral surface of said annular portion.

3. Apparatus as in claim 1 in which the part forming the cylindrical surface is a sleeve fixed to the body between the flow passages and in which the sealing assembly is movable into and out of the sleeve.

4. Apparatus as in claim 1 in which the part which forms the cylindrical surface is movable into and out of the other part and in which the sealing assembly part is carried by the body.

5. Apparatus as in claim 1 in which the sealing assembly includes two of said resilient members faced in opposite directions, there being a rigid annular member adjacent the free edge portion of the rim of each of said sealing members.

6. Apparatus as in claim 5 in which the spaces occupied by the rims of the resilient members are vented to the corresponding flow passages.

7. In a fluid flow control apparatus, means forming a body having at least two spaced flow passages adapted to be connected with associated piping, the body having a sleeve portion forming a cylindrical inner surface, the sleeve portion being disposed between the flow passages whereby fluid flow through the body occurs through the sleeve portion, an operating rod extending axially of the sleeve portion and adapted to be reciprocated, a plunger-like closure assembly secured to the operating rod, said closure assembly and operating rod being movable axially between a closed position with the assembly disposed within the cylindrical surface and a retracted open position in which the plunger assembly is removed from the sleeve and spaced axially from one end of the sleeve portion, said closure assembly including at least one pressure resisting cup-shaped sealing member made of resilient material, said member being formed to provide a rim and a base portion to which the rim is secured, said rim when contracted and disposed within the sleeve portion having an outer annular surface portion thereof located intermediate the base portion and the free edge portion of the rim in sealing engagement with the cylindrical surface to form a pressure resisting seal, said rim expanding to a diameter greater than the diameter of the cylindrical surface when the assembly is outside of the sleeve portion, said assembly including clamping members having sealed clamping engagement with said base portion, rigid restraining means carried by the plunger assembly serving to support and prevent radial expansion of the rim beyond a predetermined amount when the closure assembly is moved to a position outside and spaced from the sleeve portion, said restraining means consisting of an annular shroud surrounding and overlapping the free edge portion of the rim and having an external diameter less than the diameter of the cylindrical surface, and means for moving the operating rod to move the closure assembly from a closed valve position within the sleeve portion and with the rim in sealing engagement with the cylindrical surface, to a retracted position with the closure assembly restracted from the sleeve portion and spaced from one end of the same, said sealing member when within the cylindrical surface serving to seal against fluid pressure applied to one of said fluid passages with fluid pressure differential being applied to the inner surface area of the rim tending to expand the same, said restraining means serving to prevent abnormal expansion of the rim when the closure assembly is adjacent the entrant portion of the sleeve portion with fluid pressure being applied to one side of the same.

8. Apparatus as in claim 7 in which said restraining means includes means forming an annular lip surrounding an annular portion of the rim adjacent said base portion.

9. Apparatus as in claim 7 in which said closure assembly includes two of said sealing members, the rims of said sealing members being faced in opposite directions, each of said sealing members being provided with said restraining means.

10. In a fluid flow control apparatus, means forming a body having at least two flow passages adapted to be connected with associated piping, the body having an inner space with which the passages communicate and having a sleeve portion forming a cylindrical inner surface, the sleeve portion being disposed beteen the flow passages whereby fluid flow through the body occurs through the sleeve portion, an operating rod extending axially of the sleeve portion and adapted to be reciprocated, a plunger-like closure assembly secured to the operating rod, said closure assembly and operating rod being movable axially between a closed position with the assembly disposed within the cylindrical surface and a retracted open position in which the plunger assembly is removed from the sleeve and spaced axially from one end of the sleeve portion, said closure assembly including at least one pressure resisting cup-shaped sealing member made of resilient material, said member being formed to provide a rim and a base portion to which the rim is secured, said rim when contracted and disposed within the sleeve portion having an outer annular surface portion thereof intermediate the base portion and the free edge portion of the rim in sealing engagement with the cylindrical surface to form a pressure resisting seal, said rim expanding to a diameter greater than the diameter of the cylindrical surface when the assembly is outside of the sleeve portion, said assembly including clamping members having sealed clamping engagement with said base portion, rigid restraining means carried by the plunger assembly serving to support and prevent radial expansion of the rim beyond a predetermined amount when the closure assembly is moved to a position outside and spaced from the sleeve portion, said restraining means consisting of a rigid annular shroud surrounding the free edge portion of the rim and means forming an annular lip surrounding an annular portion of the rim adjacent said base portion, the external diameter of the shroud being less than the diameter of the cylindrical surface, and means for moving the operating rod to move the closure assembly from a closed valve position within the sleeve portion and with the rim in sealing engagement with the cylindrical surface, to a retracted position with the closure assembly retracted from the sleeve portion and spaced from one end of the same, said sealing member when within the cylindrical surface serving to seal against fluid pressure applied to one of said fluid passages with fluid pressure differential being applied to the inner surface area of the rim tending to expand the same, said restraining means serving to prevent abnormal expansion of the rim when the closure assembly is adjacent the entrant portion of the sleeve portion with fluid pressure being applied to one side of the same.

11. Apparatus as in claim 10 in which the rim as viewed in section has an outer peripheral configuration conforming to two truncated conical surfaces that are oppositely sloped, said surfaces being joined by an annular portion serving to engage and seal against the inner cylindrical surface of the sleeve.

* * * * *